United States Patent [19]

Buchanan et al.

[11] Patent Number: 5,062,175
[45] Date of Patent: Nov. 5, 1991

[54] WINDSHIELD WIPER WITH ADJUSTABLE WIPING PRESSURE

[75] Inventors: Harry C. Buchanan, Spring Valley; Keith R. Victor, Kettering, both of Ohio

[73] Assignee: General Motors Corporation, Detroit, Mich.

[21] Appl. No.: 523,952

[22] Filed: May 16, 1990

[51] Int. Cl.⁵ .................. A47L 1/02; A47L 1/00
[52] U.S. Cl. ........................ 15/103; 15/250.2
[58] Field of Search ............ 15/103, 250.2, 250.32, 15/250.35, 250.02; 337/140; 60/527

[56] References Cited

U.S. PATENT DOCUMENTS

| | | | |
|---|---|---|---|
| 2,613,387 | 10/1952 | Oishei | 15/255 |
| 3,782,121 | 1/1974 | Marcoux et al. | 60/527 |
| 4,439,886 | 4/1984 | Yagasaki et al. | 15/250 |
| 4,472,854 | 9/1984 | Bauer et al. | 15/250.2 |
| 4,698,872 | 10/1987 | Watanabe | 15/250.2 |
| 4,736,484 | 4/1988 | Bauer et al. | 15/250.2 |
| 4,777,695 | 10/1988 | Okuda et al. | 15/250.2 |

*Primary Examiner*—Henry J. Recla
*Assistant Examiner*—Dave Walczak
*Attorney, Agent, or Firm*—Patrick M. Griffin

[57] ABSTRACT

A wiper is shifted between high and low wiping pressures by thermally responsive shape memory wires that shift an overcenter spring lever between two stable positions.

2 Claims, 2 Drawing Sheets

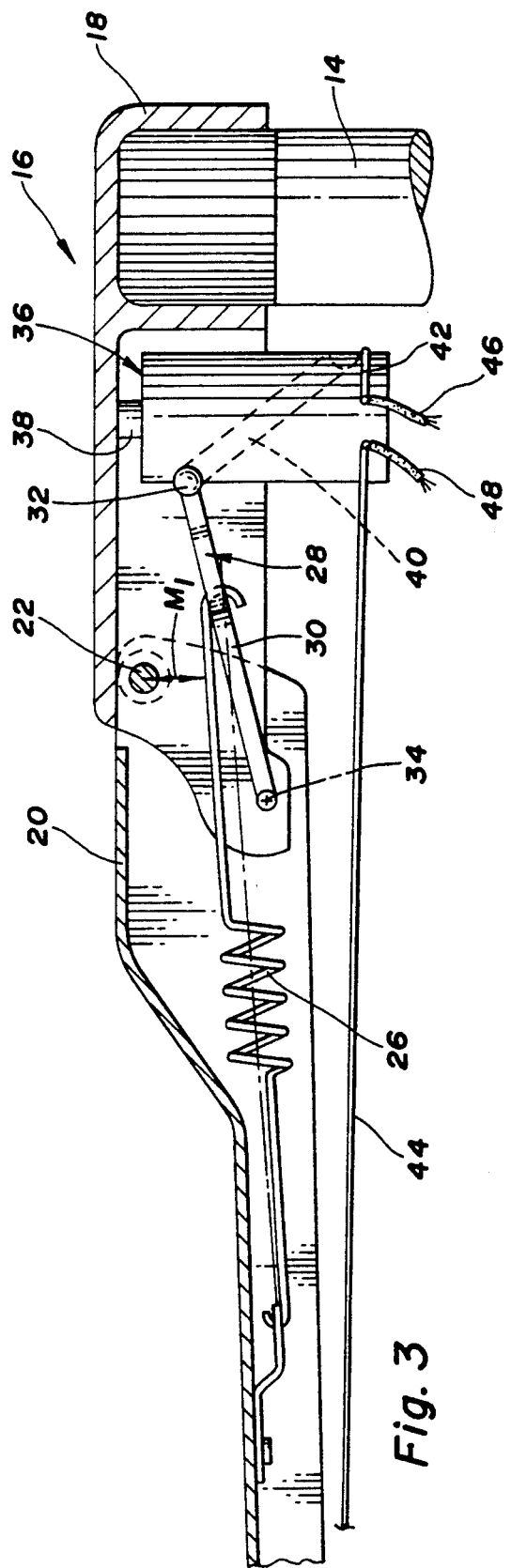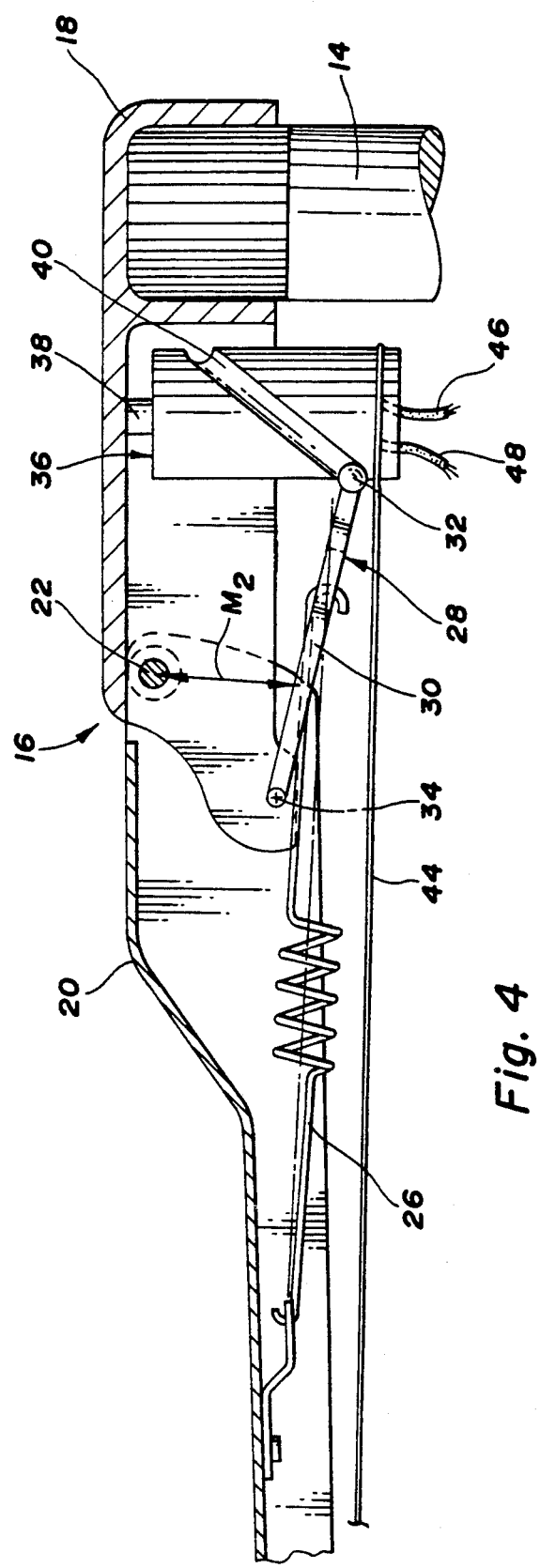
Fig. 3
Fig. 4

WINDSHIELD WIPER WITH ADJUSTABLE WIPING PRESSURE

This invention relates generally to windshield wipers, and specifically to a windshield wiper with a wiping pressure that can be selectively changed from a greater to a lesser pressure and back.

BACKGROUND OF THE INVENTION

Vehicle windshield wipers must provide some means to maintain the wiper blade pressurized against the windshield as it sweeps back and forth. Most commonly, this is done with a tension spring stretched between a base fixed to a drive shaft and a wiper arm pivoted to the base The pivot axis is above the line of force of the spring, so a moment arm is established and continual torque is applied to the wiper arm about the pivot axis that maintains pressure on a wiper blade mounted to the arm. Since it is not desirable that the wiper arm sit very high off of the windshield, the moment arm through which the spring force acts cannot be long. However, if the spring is strong enough, the torque it creates is great enough to maintain the wiping pressure, at least under most circumstances.

One circumstance where the wiping pressure may become inadequate, at least with springs of conventional strength, is at high vehicle speeds. Above a certain vehicle speed, wind lift on the blade and arm may counteract the spring sufficiently to lessen the wiping pressure. When combined with high winds in the opposite direction, the net wind acting on the blade may have an even greater effect. Providing a spring strong enough to stand up to the worst case potential wind lift would create a wiping pressure that was too high the rest of the time. Consequently, many designs for wipers with adjustable wiping force have been proposed. A common feature of most is a motor driven actuator that changes the angle of force of the tension spring to change the torque and wiping pressure that it applies Such designs also are generally bulky, complex and expensive.

SUMMARY OF THE INVENTION

The invention provides an adjustable force wiper system with an adjusting means that is considerably more simple and compact, using only a pair of oppositely acting shape memory alloy wires which, when selectively heated, drive an overcenter spring lever up or down to change the wiping pressure.

In the preferred embodiment disclosed, the wiper includes a sturdy base fixed to the wiper drive shaft, which establishes a foundation at a fixed height above the windshield. A wiper arm pivoted to the base at a main pivot axis mounts a wiper that contacts the windshield with a wiping pressure that corresponds to the downward torque on the arm about the main pivot axis. The torque on the wiper arm is provided by a tension spring stretched along a straight line between the arm and a lever pivoted to the base. The lever is pivoted to the base, at a secondary axis below the main pivot axis. Therefore, if the lever is held in a stable or fixed relation to the base, then a moment arm is established from the line of the spring base to the main pivot axis above it. The moment arm and torque are varied by pivoting the lever from one stable position to another or back.

In the embodiment disclosed, the lever is pivoted by a mechanical actuator that is in turn moved by a selectively heated, shape memory type thermally responsive means. The actuator is a barrel shaped roller with a spiral shaped groove cut into its surface that is pivoted to the wiper base. The free end of the spring lever is captured in the spiral groove, and is thus forced up and down, pivoting the lever up and down, when the roller is rotated. The roller is rotated back and forth by two strands of heat activated shape memory alloy wire Each wire strand is fixed to one side of the roller and to the tip of the wiper arm. When either strand is briefly electrically heated, it shrinks to a shorter "remembered" length, pulling on one side of the roller. This rotates the roller far enough to in turn pivot the lever far enough to shift the line of force of the spring from one side of the secondary pivot axis to the other. Two stable lever positions are thereby established relative to the base, giving longer and shorter moment arms and greater and lesser torques about the main pivot axis. In turn, greater or lesser wiping pressures of the blade are created. A circuit to selectively heat the shape memory alloy strands may be connected to a speed sensor, or may be manually controllable. The strands and rollers are compact, fitting within the space envelope of a standard sized wiper.

It is, therefore, a general object of the invention to provide a vehicle windshield wiper with a simple and compact wiping pressure adjustment means.

It is another object of the invention to provide for such adjustment through the use of an overcentering spring pressure mechanism that is shifted between two stable positions by a shape memory type thermally responsive means.

It is another object of the invention to shift the spring pressure mechanism with a pair of selectively heated stands of shape memory alloy wire which rotate a roller one way or the other when either one is momentarily heated, so as to efficiently use the space available in a conventionally sized wiper.

DESCRIPTION OF THE PREFERRED EMBODIMENT

These and other objects and features of the invention will appear from the following written description, and from the drawings, in which:

FIG. 3 is a cross section of the wiper base and part of the arm, showing the low wiping pressure condition;

FIG. 4 is a view like FIG. 3, but showing the high wiping pressure condition.

Figure 1:
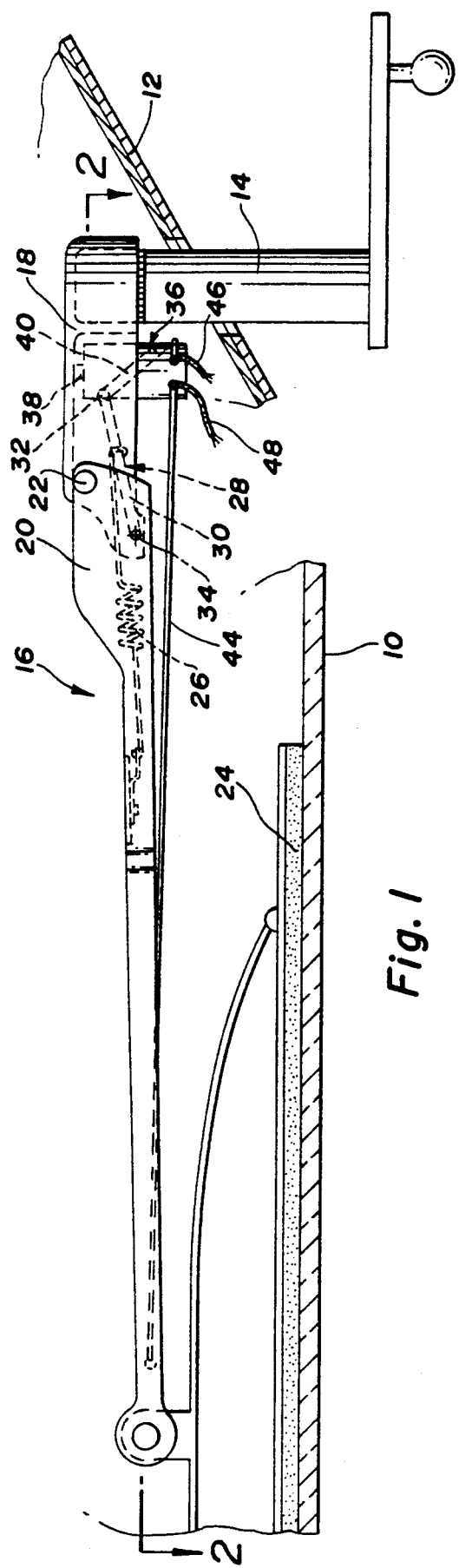
FIG. 1 is a cross section of part of a vehicle windshield and body panel showing a side view of a wiper embodying the invention.
Figure 2:
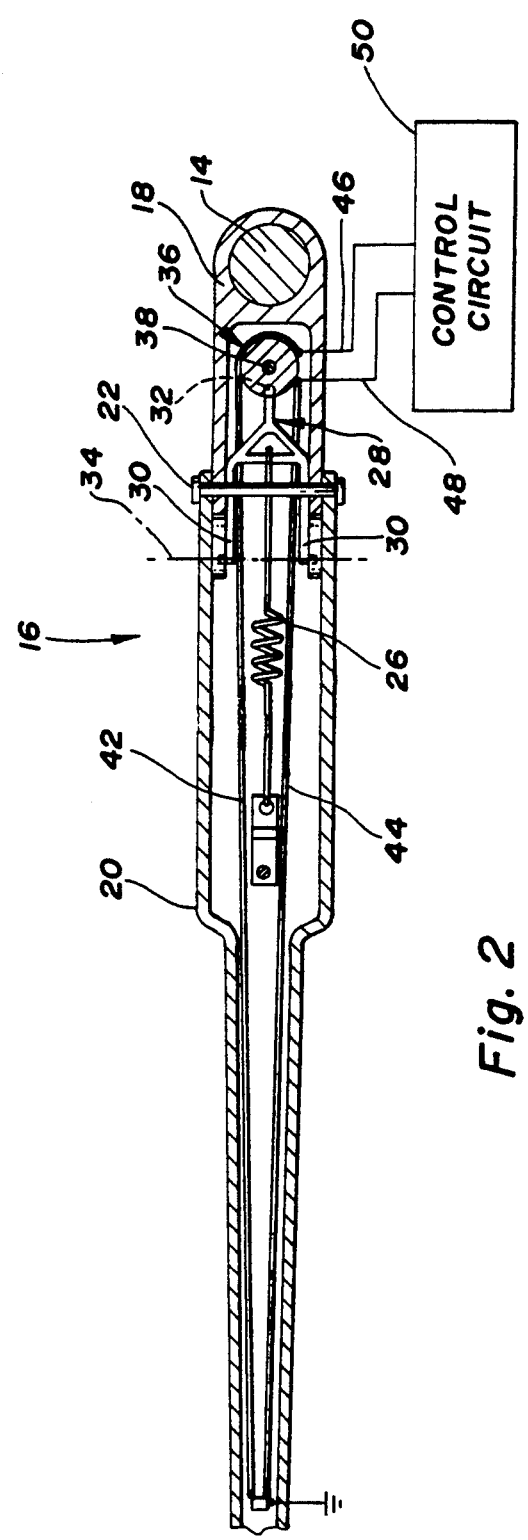
FIG. 2 is a sectional view taken along the line 2—2 of FIG. 1.

Referring first to FIGS. 1 and 2, the invention is shown in conjunction with a vehicle having a windshield 10 and a body panel 12 contiguous thereto. A preferred embodiment of a wiper according to the invention, indicated generally at 16, is powered by a conventional drive shaft 14. Drive shaft 14 journaled to body panel 12 and rotated back and forth by a drive motor and drive linkage, not illustrated. A wiper base 18 consists of a generally channel shaped sturdy metal casting, and is sometimes referred to as a casting or head casting. Base 18 is fixed to shaft 14, and therefore sweeps back and forth over windshield 10 as drive shaft 14 rotates. Since base 18 is substantially rigid, it provides a fixed foundation above windshield 10 to which other components may be attached. A wiper arm 20 also consists of a channel shaped metal piece, though it is a stamping, rather than a casting. The inner end of arm 20 is large enough to nest closely over the outside of the free end of base 18, to which it is attached with a main pivot pin 22. Pivot pin 22 provides a main pivot axis generally parallel to, and at a fixed height above, the plane of windshield 10. Consequently, arm 20 can pivot up or down on pin 22, away from or toward windshield 10, but is carried with base 18 as it sweeps back and forth. A conventional wiper blade 24 is mounted at the outer end arm 20, and presses on windshield 10 with a wiping pressure determined as described next.

Still referring to FIGS. 1, 2 and 3, the pressure of blade 24 is determined by how much torque is applied about main pivot pin 22. The torque is supplied by a coil tension spring 26, one end of which is fixed to the inside of arm 20, and the other end of which is attached to base 18 in a manner described below Spring 26 and its line of force, shown by a dotted line, run below main pivot pin 22. Consequently, a moment arm for the spring force is created relative to the axis of main pivot pin 22, indicated at $M_1$. A torque is thereby caused about pin 22, which pulls wiper blade 24 down about pin 22 and against windshield 10 with a pressure proportional to the torque. The torque could be varied, theoretically, either by varying the force of spring 26, or by varying $M_1$. The force of spring 26 could be varied by changing its degree of stretch, but since arm 20 cannot be pivoted up or down to any great extent, that is not practical. The moment arm $M_1$ can be varied, however, as is described next.

Referring next to FIGS. 2, 3 and 4, spring 26 is attached to base 18 indirectly, through a Y shaped lever, indicated generally at 28. Lever 28 has a pair of legs 30 at one end and a ball 32 at the other end. The ends of the legs 30 are pivoted to the inside walls of the base 18, defining a secondary pivot axis 34 located below the main pivot pin 22. The other end of spring 26 is hooked to lever 28, and can move freely between the legs 30 as lever 28 pivots up and down within base 18. Pivoting lever 28 up or down does not change the stretch of spring 26 appreciably, but does change $M_1$ significantly. Holding lever 28 fixed relative to base 18 at a predetermined position, therefore, determines a certain lever arm and torque. Lever 28 is held in two predetermined pivoted positions by a mechanical actuator that consists of a barrel shaped roller, indicated generally at 36. Roller 36 is pivoted to the inside of base 18 on a journal pin 38 located between lever 28 and drive shaft 14. A spiral groove 40 covers about 180 degrees and runs most of the axial length of roller 36. The ball 32 of lever 28 is captured in groove 40, and can move between limit positions defined by the ends of groove 40. Groove 40 is long enough that if ball 32 is located at the upper end, spring 26 is above secondary pivot axis 34, as shown in FIG. 3. If ball 32 is located at the lower end of spiral groove 40, then spring 26 is below secondary pivot axis 34, as in FIG. 4, creating a longer lever arm $M_2$ and consequently greater torque. The greater and lesser torques would correspond to greater and lesser pressures on blade 24. In either position, the force of spring 26 will tend to pull ball 32 further up or further down in groove 40, so each limit position of lever 28 is a stable one.

Referring still to FIGS. 2, 3 and 4, roller 36 by itself is only passive. It is powered by a thermally responsive means that consists of two separate lengths or strands of wire, 42 and 44 Each wire 42 and 44 is attached at one end to one side of roller 36, and at the other end to the tip of arm 20. If either wire 42 or 44 were pulled, it would rotate roller 36 in one direction or the other. For example, pulling on wire 42 when lever 28 was in its upper limit position would rotate roller 36 counter clockwise, from the FIG. 2 perspective. Conversely, pulling on wire 44 when lever 28 was in its lower position would rotate roller 36 clockwise. Rotating roller 36 far enough in either direction would pull ball 32 along groove 40 far enough to in turn shift spring 26 to the opposite side of secondary axis 34. At that point, spring 26 would overcenter to pivot lever 28 toward the other stable position, assisting if not over powering the wire 42 or 44. Therefore, wire 42 or 44 need not be pulled far enough to rotate roller 36 far enough to pivot lever 28 all the way from one position to the other, just far enough to overcenter it adequately.

Referring next to FIG. 2, the necessary pull is provided by making each wire 42 and 44 from a shape memory alloy, such as titanium-nickel. If heated after being stretched, such a wire will shrink and return to its original "remembered" length. Such an alloy is highly resistive, and so can be easily heated by the application of current. The heat does not have to be applied afterward to maintain the shrinkage, however, so the current need only be momentarily applied. This is done by current wires 46 and 48 connected to alloy wires 42 and 44 respectively, and in turn connected to a control circuit 50, shown only in FIG. 2. When lever 28 is in either stable position, one alloy wire will be stretched and the other not. For example, in FIG. 2, wire 42 is wrapped around and stretched by the bottom of roller 36, while wire 44 is not. If current is applied to alloy wire 42 briefly, it will shrink back to its original length, pulling on and turning roller 36 counter clockwise. Simultaneously, lever 28 will be shifted down as described above, and wire 44 will the wrap around the lower end of roller 36. Since each alloy wire 42 and 44 is made as long as it can be in a single length, running all the way from near drive shaft 14 to the tip of arm 20, a relatively small percentage value of length shrinkage should be enough to turn roller 36 enough. The control circuit 50 could be programmed to shift above a certain threshold vehicle speed, with a manual override if desired. While continuously variable torque and wiping pressure on blade 24 is not created, the two different torques described above should be adequate, and are provided by a very compact mechanism.

The embodiment 16 disclosed is uniquely suited to a conventional wiper size and configuration. The wires 42 and 44, given their length, provide a good total shrinkage, yet occupy otherwise empty volume within the channel shaped base 18 and arm 20. The roller 36 fits well within base 18, since it is of similar size, shape, and orientation to drive shaft 14, which base 18 is already sized to accommodate. Still, variations in the preferred embodiment could be made. The thermally responsive means must be the shape memory type. That is, the type that makes a quantum change when selectively heated, as opposed to the continuous, linear type of motion a thermostat bimetal element experiences. It is the quantum shift reaction to selective heating that works in cooperation with the overcenter action of lever 28 to give a quick, sure, one point to the other shift. However, other configurations of the shape memory means could be applied. For example, tightly packed coils of shape memory wire that wound up when heated could shift a suitable mechanical actuator to move lever 28.

Instead of using a mechanical actuator, the actuation could be by a more direct connection to the alloy wires. Lengths of alloy wire could run up through a hollow drive shaft 14 and through a pair of pulleys to pull the end of lever 28 up and down directly. The advantage of a mechanical actuator interposed between the shape memory means and the lever 28 is that it can establish the stable limit positions, as by the closed end groove 40 in roller 36, as well as moving the lever 28. If a shape memory alloy that shrank less per inch were to be used, then a double strand could be run around a pulley at the tip of arm 20 and back, increasing the total shrinkage. Therefore, it will be understood that the invention is not intended to be limited to the embodiment disclosed.

The embodiments of the invention in which an exclusive property or privilege is claimed are defined as follows:

1. In a vehicle having a windshield, a windshield wiper with adjustable wiping pressure, comprising, a wiper drive shaft, a base fixed to said wiper drive shaft above said windshield, a wiper arm pivoted to said base so as to pivot toward and away from said windshield about a main pivot axis, a wiper blade mounted to said wiper arm so as to engage said windshield with a wiping pressure dependent upon the torque on said wiper arm as measured about said main pivot axis, a lever pivoted to said base so as to pivot up or down about a secondary pivot axis located below said main pivot axis, a tension spring having one end fixed to said wiper arm and another end fixed to said lever, so that, when said lever is held in a stable position relative to said base, said spring pulls said wiper arm down about said main pivot axis toward said windshield with a moment arm, and, thermally responsive shape memory means adapted, when selectively heated, to move said lever far enough to in turn move said spring line of force from a first stable position above said secondary axis to a second stable position below said secondary axis, thereby establishing lesser and greater moment arms corresponding to lesser and greater torques on said wiper arm about said main pivot axis, whereby, greater or lesser wiping pressures may be applied to said wiper blade by selectively heating said thermally responsive shape memory means.

2. In a vehicle having a windshield, a windshield wiper with adjustable wiping pressure, comprising, a wiper drive shaft, a base fixed to said wiper drive shaft above said windshield, a wiper arm pivoted to said base so as to pivot toward and away from said windshield about a main pivot axis, a wiper blade mounted to said wiper arm so as to engage said windshield with a wiping pressure dependent upon the torque on said wiper arm as measured about said main pivot axis, a lever pivoted to said base so as to pivot up or down about a secondary pivot axis located below said main pivot axis, a tension spring having one end fixed to said wiper arm and another end fixed to said lever, so that, when said lever is held in a stable position relative to said base, said spring pulls said wiper arm down about said main pivot axis toward said windshield with a moment arm, a mechanical actuator movably mounted to said base and adapted to pivot said lever up or down about said secondary axis as said actuator is moved relative to said base between a pair of stable limit positions where the spring line of force is located above and below said secondary axis respectively, thereby establishing lesser and greater moment arms relative to said main pivot axis corresponding to lesser and greater torques on said wiper arm about said main pivot axis, and, thermally responsive shape memory means adapted, when selectively heated, to move said mechanical actuator far enough to move said lever between said limit positions, whereby, greater or lesser wiping pressures may be applied to said wiper blade by selectively heating said thermally responsive shape memory means.

* * * * *